United States Patent
Kwun et al.

(10) Patent No.: US 7,599,694 B2
(45) Date of Patent: Oct. 6, 2009

(54) METHOD FOR TRANSMITTING UPLINK DATA DURING HANDOFF

(75) Inventors: Jong-Hyung Kwun, Seoul (KR); Chi-Hyun Park, Suwon-si (KR); Yung-Soo Kim, Seongnam-si (KR); Sung-Hyun Cho, Suwon-si (KR); Ok-Seon Lee, Suwon-si (KR); Jung-Hoon Cheon, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 483 days.

(21) Appl. No.: 11/451,880

(22) Filed: Jun. 12, 2006

(65) Prior Publication Data

US 2006/0281464 A1    Dec. 14, 2006

(30) Foreign Application Priority Data

Jun. 10, 2005    (KR) ...................... 10-2005-0050057

(51) Int. Cl.
*H04W 36/00*    (2006.01)

(52) U.S. Cl. ................... 455/436; 455/437; 455/438; 455/442; 370/331

(58) Field of Classification Search ................ 370/331; 455/436, 437, 438, 442

See application file for complete search history.

(56) References Cited

U.S. PATENT DOCUMENTS

| 5,781,541 | A  | * | 7/1998 | Schneider | 370/335 |
| 2003/0076870 | A1 | * | 4/2003 | Moon et al. | 375/130 |
| 2004/0160925 | A1 | * | 8/2004 | Heo et al. | 370/335 |
| 2007/0032241 | A1 | * | 2/2007 | Busch et al. | 455/450 |

* cited by examiner

*Primary Examiner*—Dwayne Bost
*Assistant Examiner*—Pierre-Louis Desir
(74) *Attorney, Agent, or Firm*—The Farrell Law Firm, LLP

(57) ABSTRACT

Disclosed is a method for transmitting an uplink data during handoff. A method for transmitting uplink data in a soft handoff system, in which a mobile station is simultaneously connected with at least two base transceiver systems under a control of a base station controller, includes selecting one of the base transceiver systems as a main base transceiver system, transmitting uplink signals to the main base transceiver system and sub-base transceiver systems, and transmitting by the sub-base transceiver systems received uplink signals to the main base transceiver system. Through the method, a main BTS for diversity combining and decoding soft bit strings is established among BTSs connected to a mobile station, so that it is possible to distribute a data processing amount centralized on a BSC to a BTS.

5 Claims, 8 Drawing Sheets

METHOD FOR TRANSMITTING UPLINK DATA DURING HANDOFF

PRIORITY

This application claims priority to an application entitled "Method for Transmitting Uplink Data in Handoff" filed in the Korean Intellectual Property Office on Jun. 10, 2005 and assigned Serial No. 2005-50057, the contents of which are incorporated herein by reference.

BACKGROUND OF THE INVENTION

1. Field of the Invention

The present invention relates to a mobile communication system, and more particularly to a method for transmitting uplink data during handoff of a mobile station.

2. Description of the Related Art

FIG. 1 is a schematic block diagram illustrating the structure of a conventional cellular communication network. Generally, base transceiver systems (BTSs) 111 to 113 and a BTS 114, which provide radio interfaces to a mobile station, are connected to BTS controllers (BSCs) 121 and 122, respectively. The BSCs 121 and 122 are connected with each other in order to share control information between them, and these are connected to a core network 130 including an authentication, authorization, and accounting server and a home agent for security.

A mobile station performs handoff under the control of the BSCs in the network having the above-described structure and transmits the same data to BTSs connected to the mobile station while performing the handoff.

FIG. 2 is a view for explaining a method for transmitting uplink data when performing intra-BSC handoff in the conventional cellular communication network. A mobile station 10 transmits the same data signal to two BTSs 111 and 112 connected to the mobile station. The two BTSs 111 and 112 having received the data signal from the mobile station 10 decode the data signal. If the two BTSs 111 and 112 successfully decode the data signal, they transmit a cyclic redundancy check (CRC) value and data to the BSC 121. If the two BTSs 111 and 112 fail to decode the data signal, they transmit only a CRC value to the BSC 121.

FIG. 3 is a view for explaining a method for transmitting uplink data when performing inter-BSC handoff in the conventional cellular communication network. Each of the BTSs 111 and 112 demodulates a data signal received from the mobile station 110 and transmits the demodulated soft data bit string and corresponding channel information to the BSCs 121 and 122 connected to the BTSs 111 and 112, respectively. The BSCs 121 and 122 decode soft data bit strings received from the BTSs 111 and 112 by diversity-combining the soft data bit strings.

However, in the case of the intra-BSC handoff, it is difficult to obtain a sufficient amount of a decoding gain after diversity-combining soft data bit strings received through two different paths even though it is possible to obtain data having high reliability based on a CRC value.

In addition, in the case of the inter BSC handoff, although it is possible to obtain a sufficient amount of a decoding gain, since a vast amount of traffic due to the transmission of soft data bits between BTCs and BSCs is generated, a computation amount for decoding signals transmitted from a plurality of BTSs and a memory having a mass storage capacity for storing previously received signals due to a time delay to receive soft data bit strings from BTSs are required.

SUMMARY OF THE INVENTION

Accordingly, the present invention has been made to solve the above-mentioned problems occurring in the prior art, and an object of the present invention is to provide a method for transmitting and processing an uplink signal in a soft (Make-Before-Break: MBB) handoff, which can reduce an amount of data delivered to a base station controller from a base transceiver system while obtaining a sufficient amount of a decoding gain by diversity-combining uplink soft bit strings.

Another object of the present invention is to provide a method for transmitting and processing an uplink signal in a soft (Make-Before-Break: MBB) handoff, which can distribute an amount of data processed in a base station controller to a base transceiver system by establishing a main base transceiver system diversity-combining and decoding soft bit strings among base transceiver systems connected to the mobile station.

To accomplish the above objects, there is provided a method for transmitting uplink data in a soft handoff system, in which a mobile station is simultaneously connected with at least two base transceiver systems under a control of a base station controller, the method including selecting one of the base transceiver systems as a main base transceiver system, transmitting uplink signals to the main base transceiver system and sub-base transceiver systems, and transmitting by the sub-base transceiver systems received uplink signals to the main base transceiver system.

Preferably, it is determined if the mobile station supports partial incremental redundancy transmission and full incremental redundancy transmission. If the mobile station supports the incremental redundancy transmission, an uplink signal including a systematic bit and a first parity bit is transmitted to the main base transceiver system, and an uplink signal including the systematic bit and a second parity bit is transmitted to the sub-base transceiver system if the mobile station supports the partial incremental redundancy.

According to another aspect of the present invention, there is provided a method for transmitting same uplink data in a soft handoff system, in which a mobile station is simultaneously connected with at least two base transceiver systems under a control of a base station controller, the method including selecting one of the base transceiver systems as a main base transceiver system, and diversity-combining by the main base transceiver system uplink signals transmitted to the base transceiver systems from the mobile station.

Preferably, the step of diversity-combining by the main base transceiver system the uplink signals includes extracting soft bit strings by demodulating the uplink signals received in the base transceiver systems connected with the mobile station, transmitting channel information and the soft bit strings to the main base transceiver system from sub-base transceiver systems excluding the main base transceiver system, and diversity-combining by the main base station controller the soft bit strings.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
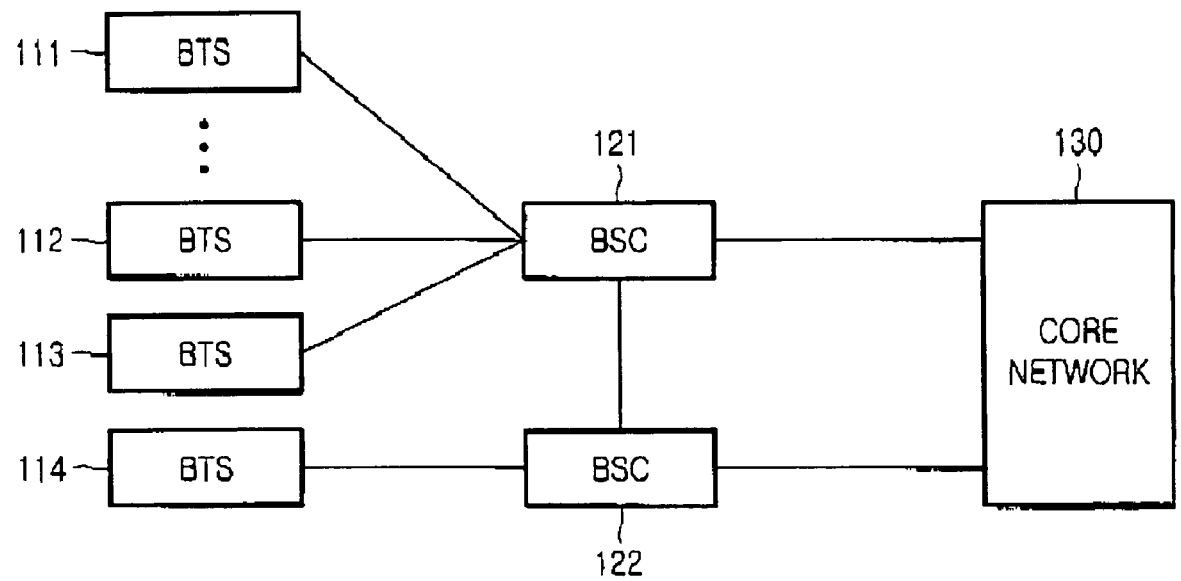
FIG. 1 is a schematic block diagram illustrating the structure of the conventional cellular communication network.
Figure 2:
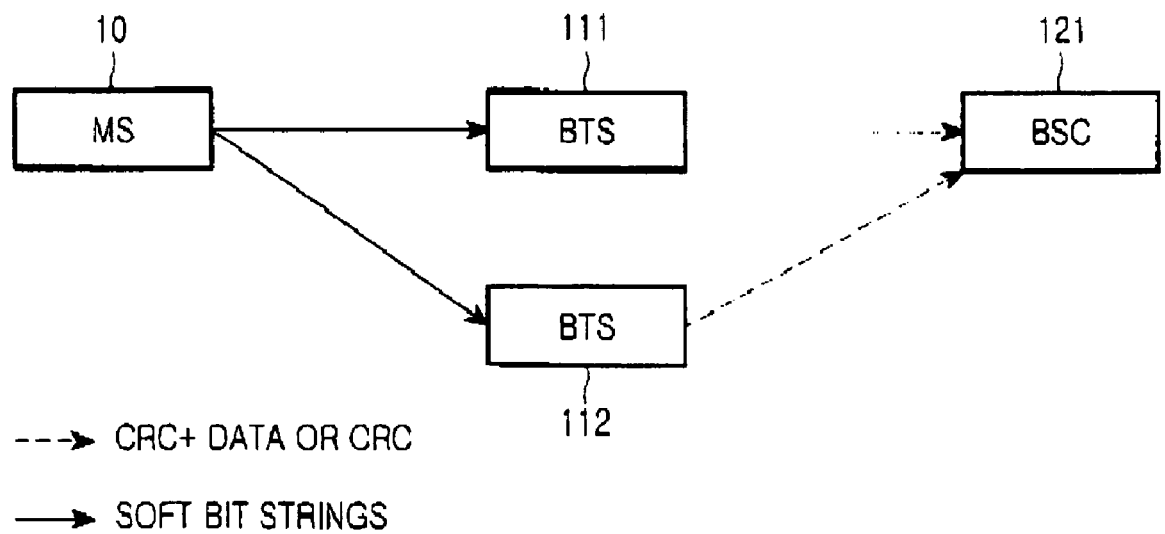
FIG. 2 illustrates a method for transmitting uplink data when performing intra-BSC handoff in the conventional cellular communication network.
Figure 3:
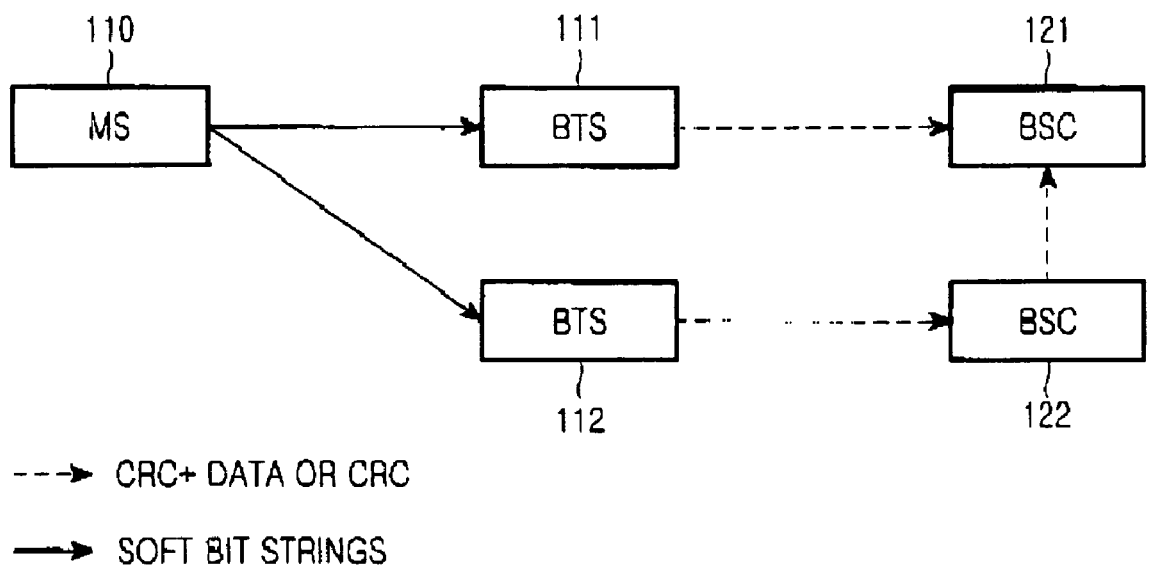
FIG. 3 illustrates a method for transmitting uplink data when performing inter-BSC handoff in the convention cellular communication network.

Hereinafter, a preferred embodiment of the present invention will be described in detail with reference to the accompanying drawings. Note that the same or similar components in drawings are designated by the same reference numerals as far as possible although they are shown in different drawings. In the following description of the present invention, a detailed description of known functions and configurations incorporated herein will be omitted when it may make the subject matter of the present invention unclear.

Through a method for transmitting uplink data during handoff according to the present invention, one of base transceiver systems (BTSs) connected to a mobile station in order to perform the handoff is established as a main BTS, and sub-BTSs except for the main BTS transmit soft bit strings and uplink channel information to the main BTS through high-speed data transmission interface intra-BTS controllers by demodulating received signals, and the main BTS decodes the soft bit strings by diversity-combining the soft bit strings.

In addition, when the mobile station supports inter-cell soft handoff or inter-sector softer handoff through different radio resources for a plurality of BTSs and uplinks and transmits data using a turbo encoder or a low density parity check (LDPC) encoder as an uplink channel encoder, the mobile station individually transmits different parity bits in a partial incremental redundancy (IR) format using a puncturing characteristic of the encoder, and the main BTS diversity-combines and decodes soft bit strings received from the BTSs so as to process packets.

In addition, when the mobile station supporting inter-cell soft handoff or inter-sector softer handoff through different radio resources for a plurality of BTSs and uplinks and transmits data using a turbo encoder or a LDPC encoder as an uplink channel encoder, the mobile station can transmit independently data in a full IR format. In other words, the mobile station transmits soft bit strings including systematic bits and parity bits to the main BTS and transmits soft bit strings including only parity bits to the sub-BTS. In this case, the main BTS diversity-combines and then decodes soft bit strings received from the mobile station and soft bit strings received from the sub-BTSs and processes the decoded soft bit strings in a packet format.

Figure 4:
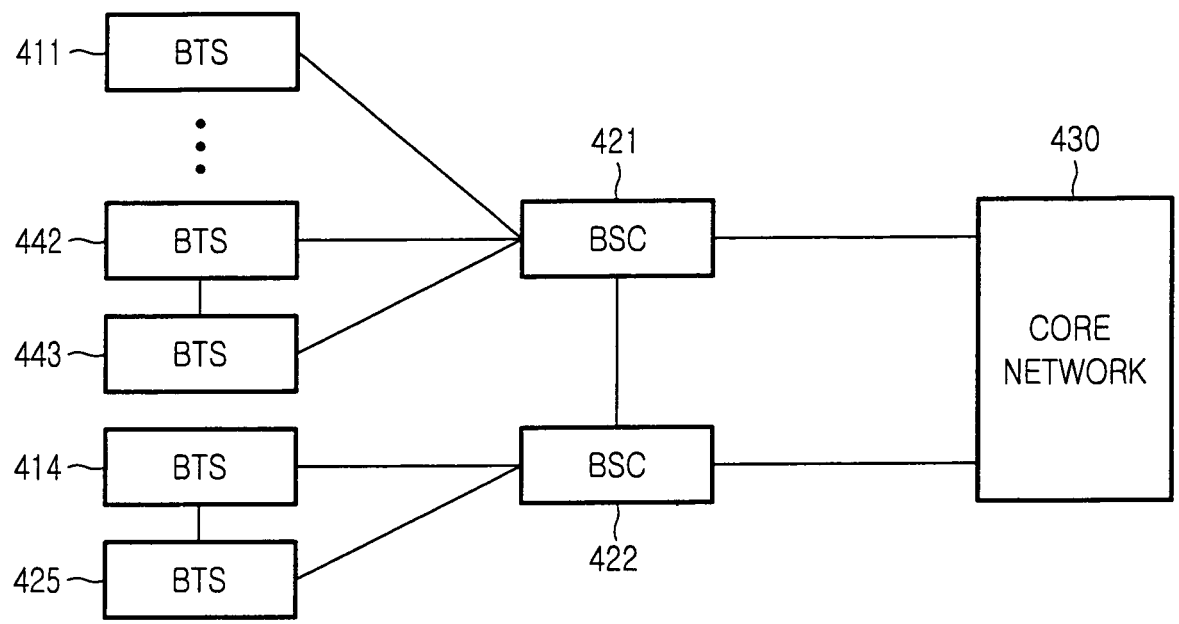
FIG. 4 is a schematic block diagram illustrating the structure of a cellular communication network according to an embodiment of the present invention.

FIG. 4 is a schematic block diagram illustrating the structure of a cellular communication network according to the present invention.

As shown in FIG. 4, a plurality of BTSs 411 to 415 provide radio interfaces to mobile terminals (not shown) under the control of corresponding BTS controllers (BSCs) 421 and 422 wire-connected to the BTSs 411 to 415 in the cellular communication network. In addition, the BSCs 421 and 422 are connected to a core network 430 and make communication with each other through connection between them.

In addition, BTSs under the control of the same BSC are connected to each other through a high-speed interface. In other words, the first BTS to the third BTS 411 to 413 under the control of the first BSC 421 have a wire or wireless connection among them, and the fourth BTS 414 and the fifth BTS 415 under the control of the second BST 422 have a connection between them.

Figure 5:
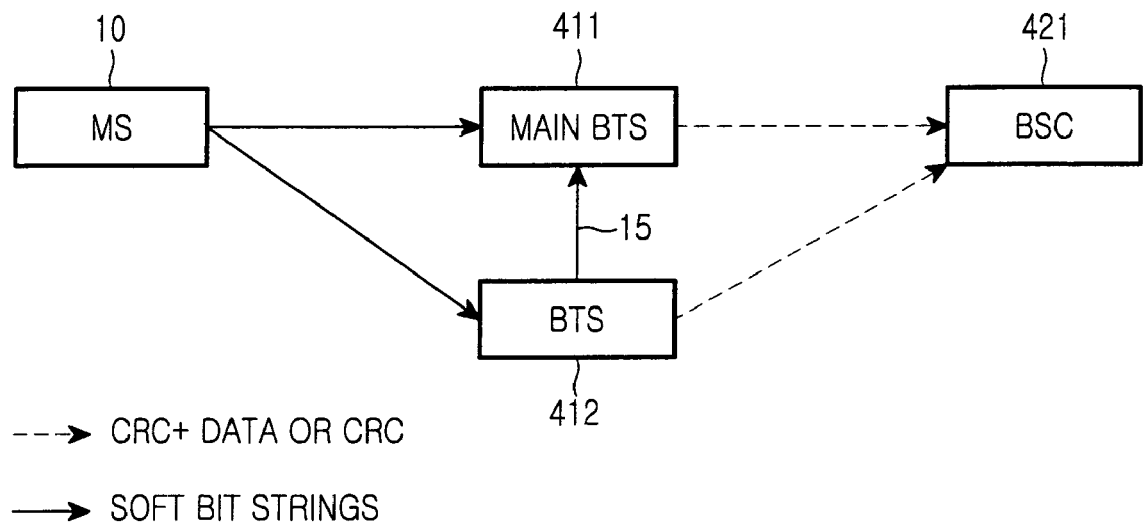
FIG. 5 illustrates a method for transmitting uplink data when performing intra-BSC handoff in a cellular communication network shown in FIG. 4.
Figure 6:
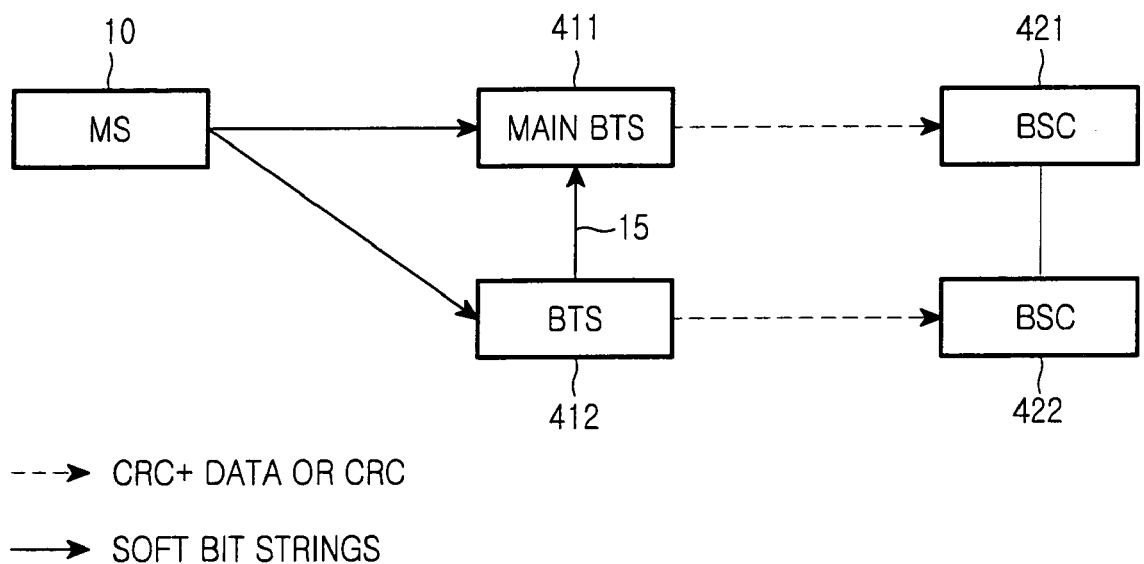
FIG. 6 illustrates a method for transmitting uplink data when performing inter-BSC handoff in a cellular communication network shown in FIG. 4.

FIGS. 5 and 6 are block diagrams for explaining an uplink data processing scheme when intra BSC handoff and inter BSC handoff are performed in the cellular communication network shown in FIG. 4.

As shown in FIGS. 5 and 6, the mobile station 10 selects one of BTSs 411 and 412 connected to the mobile station 10 during handoff as a main BTS 411 and transmits data to the BTSs 411 and 412. The BTSs 411 and 412 extract soft bit strings by demodulating the uplink data received from the mobile station, and the sub-BTS 412 among the BTSs transmits the extracted soft bit strings and channel information to the main BTS 411 through a high-speed interface 15 between BTSs. The main BTS 411 diversity-combines the soft bit strings extracted by it with the soft bit strings received from the sub-BTS 412 and then decodes the combined soft bit strings so as to process a corresponding packet. The diversity combining scheme may be one selected from a maximal ratio combining (MRC) scheme, an equal gain combining (EGC) scheme, a selection scheme using only optimum soft bit strings based on channel information, and a scheme obtained by combining the three schemes, which MRC-combines only channel information above a threshold value.

In the case of the inter-BSC handoff of FIG. 6, it is preferred that a handoff procedure between two BSCs 421 and 422 is performed according to the control of the BSC 421 connected to the main BTS 411.

When an uplink connection between a BTS/sector and a mobile station is formed through mutually independent radio resource allocation according to an embodiment of the present invention (for example, a case where "Make-Before-Break" handoff with a mobile station is supported using frequencies having mutually different bands and time slots between BTSs, or a case where frequencies having mutually different bands and time slots are used between sectors in a sectorized system), the mobile station transmits mutually-different uplink signals through radio resources for different BTSs/sectors in order to increase reliability for uplink data transmission and an amount of the uplink data transmission.

When the mobile station transmits data according to a partial IR mechanism, the mobile station transmits the same systematic bit and different parity bits to different BTSs/sectors, so that it is possible to maximize a decoding gain obtained after diversity-combining while performing a self-decoding operation. In addition, when the mobile station transmits data according to a full IR mechanism, the mobile station transmits a couple of a systematic bit and a parity bit to a main BTS/sector receiving a current uplink signal and only a parity bit to remaining BTSs/sectors.

In an uplink data transmission method during handoff according to of the present invention, it is considered that uplink soft bit strings are received in BTSs, respectively, with different time delays. The differences between time delays of soft bit strings may occur due to a time delay occurring in a data plane interface between BTSs, an amount of load of each BTS/sector, or a radio resource allocation scheme. According to the present invention, a main BTS is established, which collects, combines, and decodes soft bit strings received in a plurality of BTSs/sectors from the mobile station during handoff, and the main BTS compensates for the time delays.

It is preferred that the main BTS is selected as a BTS having a minimum time delay for the mobile station among BTSs/sectors connected to the mobile station during handoff.

The main BTS stores a signal received therein in a memory, waits for soft bit strings and channel information received from the BTSs/sectors excluding the main BTS in communication with the present mobile station during a predetermined time interval until the soft bit strings and the channel information are received in the main BTS, diversity combines the received soft bit strings with each other, and decodes the soft bit strings. However, although the time interval set by the timer has expired, if the soft bit strings are not transmitted to the main BTS, the main BTS diversity-combines and decodes only both received signals and soft bit strings received until then. Then, the main BTS reports time out to BTSs/sectors which do not transmit soft bit strings. Since the main BTS must be able to perform individual decoding only using its received signal in the above-described procedure, the mobile station transmits data to BTSs/sectors according to a partial IR mechanism enabling individual decoding. In the above-described procedure, when the mobile station transmits data according to a full IR mechanism, the mobile station must transmit data allowing individual decoding, which includes a systematic bit, to the main BTS.

Figure 7:
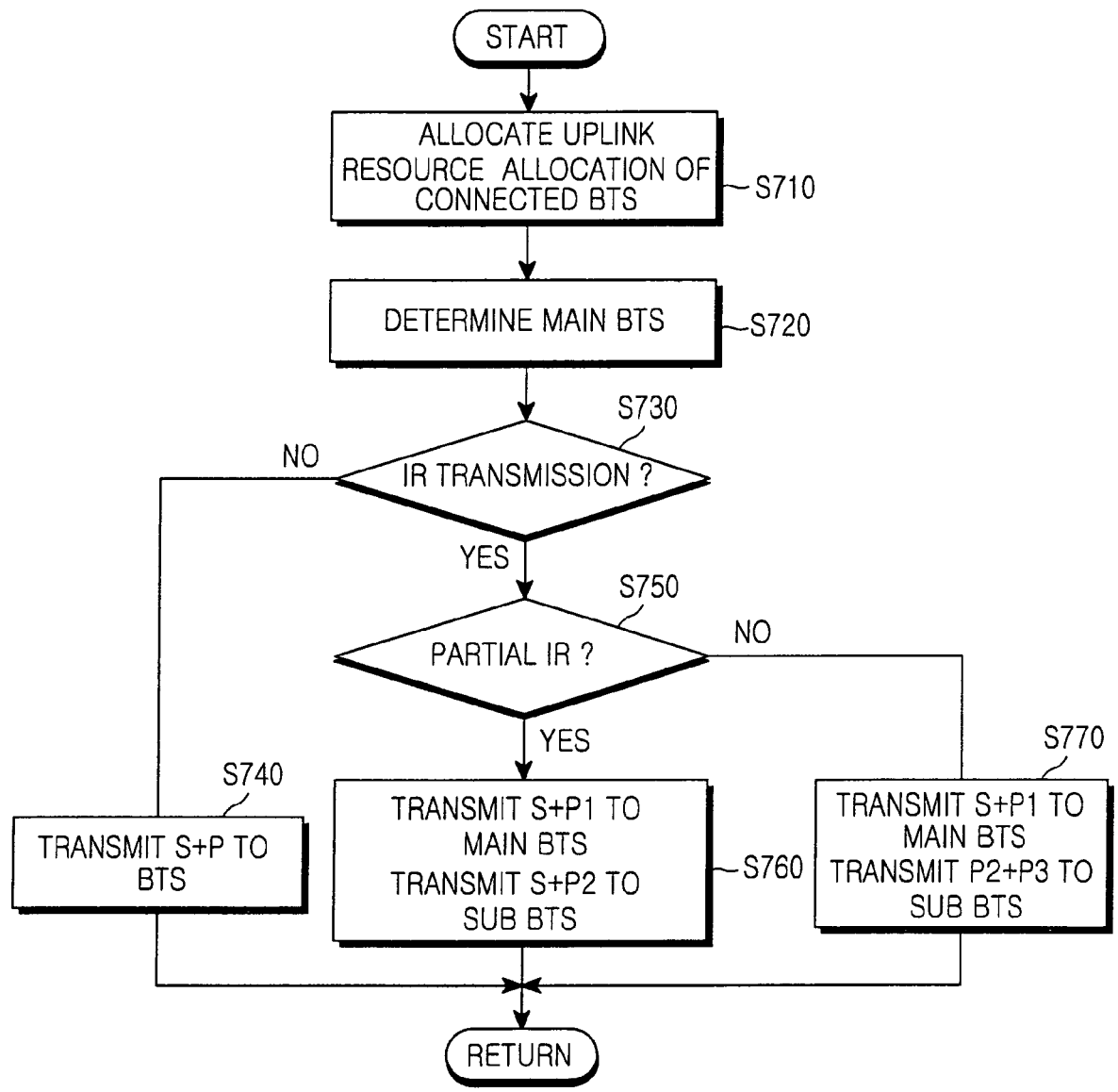
FIG. 7 is a flowchart of a method for transmitting uplink data during handoff according to an embodiment of the present invention.

FIG. 7 is a flowchart of a method for transmitting uplink data during handoff according to of the present invention. If soft handoff (Make-Before-Break) is determined, the mobile station is allocated uplink resources from each BTS concerned with the soft handoff (step S710), and a main BTS for combining data is determined (step S720). The main BTS is determined as a BTS having a minimum time delay with the mobile station among BTSs concerned with the handoff. If the main BTS is determined, it is determined if the mobile station supports IR transmission (step S730). If the mobile station does not support IR transmission, soft bit strings including systematic bits and parity bits are transmitted to BTSs (step S740). If the mobile station supports IR transmission, it is determined if a partial IR mechanism is supported or if a full IR mechanism is supported (step S750). If the partial IR mechanism is supported, the mobile station transmits a systematic bit and soft bit strings including first parity bits to the main BTS. In addition, in this case, the mobile station transmits soft bit strings including a systematic bit and second parity bits to sub-BTSs (step S760). In the meantime, if the full IR transmission is supported, the mobile station transmits soft bit strings including systematic bits and first parity bits to the main BTS and soft bit strings including a systematic bit, a second parity bit, and a third parity bit to the sub-BTSs (step S770).

Figure 8:
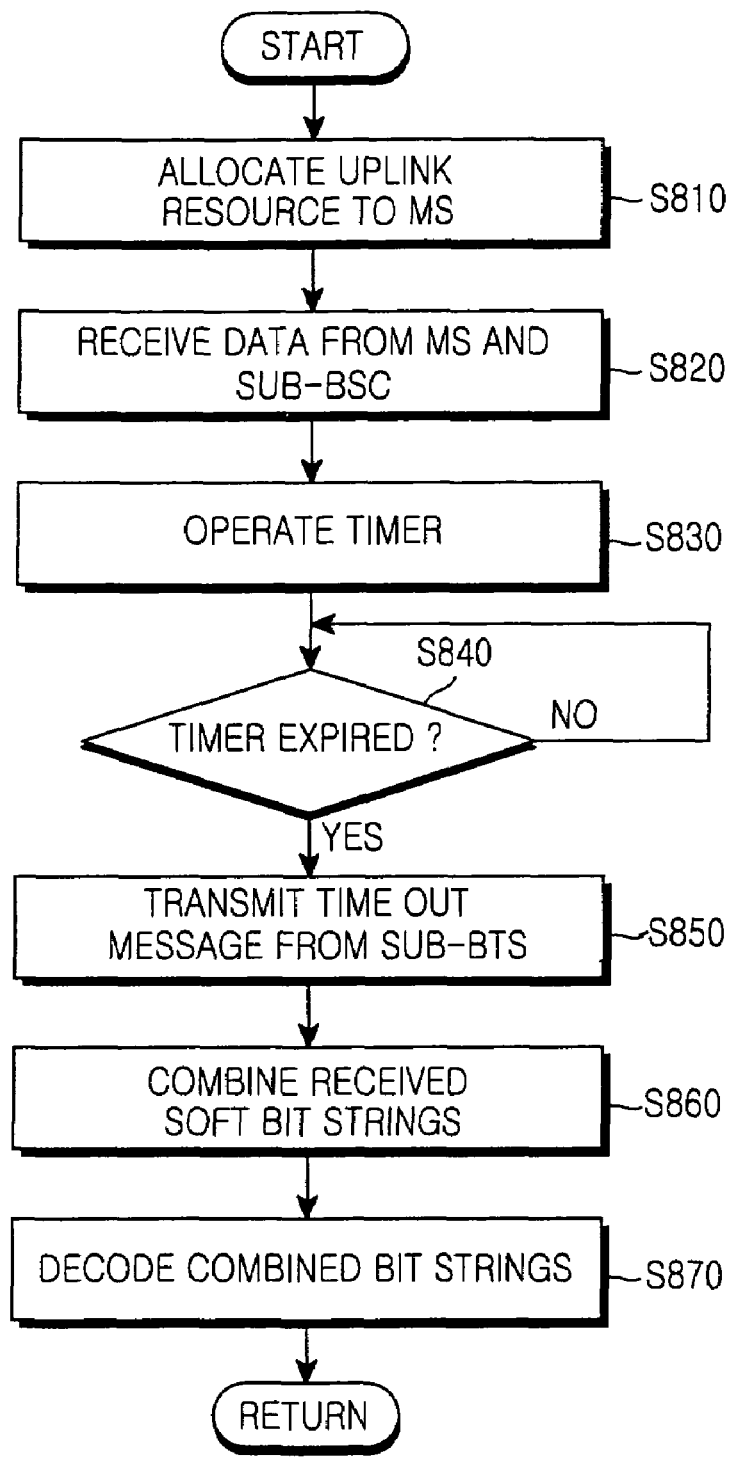
FIG. 8 is a flowchart of a method for receiving data of a main BTS during handoff according to an embodiment of the present invention.

FIG. 8 is a flowchart of a method for receiving data of the main BTS during handoff according to the present invention.

As shown in FIG. 8, a BTS determined as a main BTS allocates uplink resources to a mobile station (step S810) and drives a timer used for buffering soft bit strings (step S830) while receiving soft bit strings from a mobile station and a sub-BTS (step S820). Simultaneously, the main BTS determines if the timer has expired (step S840). If the timer has expired, the main BTS decodes received soft bit strings (step S870) by combining the received soft bit strings with each other (step S860) while transmitting a time out message to sub-BTSs (step S850). Data repeatedly received in the main BTS after the timer has expired are discarded.

As described above, in a method for transmitting and processing uplink data during handoff according to the present invention, a BTS diversity-combines and decodes soft bit strings while obtaining a sufficient decoding gain through diversity combining of uplink soft bit strings, so that it is possible to reduce an amount of traffic delivered to a BSC.

Additionally, in a method for transmitting and processing uplink data during handoff according to the present invention, a main BTS for diversity combining and decoding soft bit strings is established among BTSs connected to a mobile station, so that it is possible to distribute a data processing amount centralized on a BSC to a BTS.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A method for transmitting uplink data in a soft handoff system, in which a mobile station is simultaneously connected with a plurality of base transceiver systems under a control of a base station controller, the method comprising the steps of:

designating, by the mobile station, a main base transceiver system and a sub-transceiver system among the base transceiver systems;

transmitting, by the mobile station, first and second uplink signals to the main base transceiver system and the sub-base transceiver system, respectively;

transmitting, by the sub-base transceiver system, the second uplink signals to the main base transceiver system; and diversity-combining, by the main base transceiver system, the first uplink signal with the second uplink signal, wherein if the mobile station supports partial incremental redundancy transmission, the first uplink signal includes a systematic bit and a first parity bit and the second uplink signal includes the systematic bit and a second parity bit, and wherein diversity combining the first uplink signal with the second uplink signal comprises;

extracting, by the sub-base transceiver system, a first soft bit string by demodulating the second uplink signal;

transmitting, by the sub-base transceiver system, the first soft bit string to the main base transceiver system;

extracting, by the main base transceiver system, a second soft bit string by demodulating the first uplink signal; and diversity-combining by the main base transceiver system, the soft bit string with the second soft bit string.

2. The method as claimed in claim 1, wherein the main base transceiver system is a base transceiver system having a minimum time delay among the base transceiver systems.

3. The method as claimed in claim 1, wherein if the mobile station does not support incremental redundancy transmission, the first and second uplink signals both include a systematic bit and parity bit.

4. The method as claimed in claim 1, wherein if the mobile station supports full incremental redundancy transmission, the first uplink signal includes a systematic bit and a first bit and the second uplink includes a second parity bit and a third parity bit.

5. The method as claimed in claim 1, wherein the first soft bit string is transmitted through a high-speed data transmission interface between the main base transceiver system and the sub-transceiver system.

* * * * *

UNITED STATES PATENT AND TRADEMARK OFFICE
CERTIFICATE OF CORRECTION

PATENT NO. : 7,599,694 B2 Page 1 of 1
APPLICATION NO. : 11/451880
DATED : October 6, 2009
INVENTOR(S) : Kwun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 599 days.

Signed and Sealed this

Twenty-eighth Day of September, 2010

David J. Kappos
*Director of the United States Patent and Trademark Office*